UNITED STATES PATENT OFFICE 2,449,940

ORGANO-DI-SILOXANES AND METHODS OF MAKING THEM

James Franklin Hyde, Corning, N. Y., assignor to Corning Glass Works, Corning, N. Y., a corporation of New York No Drawing. Application December 16, 1944, Serial No. 568,557

11 Claims. (Cl. 260—448.2)

This invention relates to organo-di-siloxanes and is a continuation-in-part of my copending applications Serial Number 432,528, filed February 26, 1942, and Serial Number 483,451, filed April 17, 1943, now abandoned.

Tri-organo-silanes of the general formula RR'R''SiX can be prepared by means of the well-known Grignard reaction, where R, R' and R'' represent organic radicals attached to silicon through a carbon atom and X represents a hydrolyzable atom or group, hereinafter called hydrolyzable radical, such as halogen, alkoxy, hydrogen, amino, and the like. Such tri-organo-silanes can be hydrolyzed by treatment with water and dehydrated to yield symmetrical di-siloxanes in which three of the four silicon bonds are blocked by the organic radicals R, R' and R''.

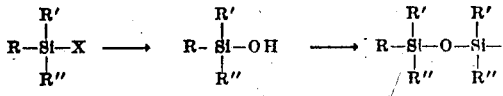

In some cases the intermediate hydroxy silanes or silanols can be isolated. The presence of acids and alkalies catalyzes both the hydrolysis and the condensation reactions. Dehydrating agents also promote the condensation reaction. The completely dehydrated products are either crystalline or liquid at room temperature.

The primary object of this invention is to prepare new compositions of matter comprising unsymmetrical organo-di-siloxanes in which the two silicon atoms each have different organo substituents.

Another object is to provide a method of preparing an unsymmetrical organo-di-siloxane which is composed of two different structural units of the formula

linked together by an oxygen atom between the silicon atoms, where each R represents an organic radical attached to silicon through a carbon atom.

Another object is to provide a method of intercondensing two different tri-organo silanes.

Another object is to provide a method of intercondensing two different compounds of the general formula R₃SiX, where each R is an organic radical attached to silicon through a carbon atom and X is a hydrolyzable radical.

The new method generally comprises intercondensing the hydrolysis products of two different tri-organo silanes of the general formulae RR'R''SiX and R'''R''''R'''''SiY, where R, R', R'', R''', R'''' and R''''' are the same or different organic radicals attached to silicon through a carbon atom, and X and Y are the same or different hydrolyzable radicals. This may be accomplished by first mixing the silanes, hydrolyzing them by the addition of the requisite amount of water to which a catalyst such as hydrochloric acid preferably is added, and intercondensing the resulting silanols by dehydration thereof. A mixture of disiloxanes is thus obtained which comprises the unsymmetrical ether,

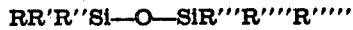

and the two symmetrical ethers

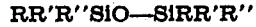

and

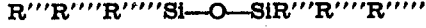

respectively. The unsymmetrical ether may be separated by fractional distillation, but for some purposes the mixture thus obtained comprising both the symmetrical ethers and the unsymmetrical ether constitutes a desirable product. The largest yield of the unsymmetrical ether is obtained when approximately equimolecular proportions of the two tri-organo silanes are employed. However, other proportions in molecular ratios as high as 50 to 1 or higher may be employed with the resulting suppression of the formation of the symmetrical ether corresponding to the lesser silane. This is advantageous when for any reason the formation or presence of one of the symmetrical ethers is objectionable.

It may be desirable to vary the conditions of the process in view of differences in the reactivities or physical properties of various tri-organo silanes and their silanols. For instance, some tri-organo silanols can be prepared and purified more readily than the corresponding hydrolyzable silanes. Hence it may be advantageous in such cases to separately hydrolyze one or both of the tri-organo silanes and thereafter to bring about their mixture and intercondensation. Moreover, I have found that some tri-organo silanols react readily with some tri-organo silanes and produce directly the di-siloxane. If desired, the reactants may be dissolved in a common solvent such as alcohol, dioxan, acetic acid, acetone, etc.

The variety of the substituted organic radicals is limited only by their ability to form a Grignard reagent. In other words, the tri-organo silanes which may be employed in my process include all such compounds which contain a hydrolyzable radical and which may be prepared by means of the well-known Grignard reaction. The radicals which may thus be substituted may include alkyl radicals such as methyl, ethyl, propyl, isopropyl, butyl, isobutyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc.; naphthyl, mono- and polyalkyl naphthyls, as methyl naphthyl, diethyl naphthyl, tripropyl, etc.; tetrahydronaphthyl, anthracyl, etc.; aralkyl such as benzyl, phenylethyl, etc.; alkenyl such as methallyl, allyl, etc.

If the hydrolyzable radicals of all of the silanes in the mixture to be hydrolyzed are halogens, it is preferable to employ dioxan as the solvent because it is inert to the halogens. If the mixture contains both halogens and alkoxy groups, the former can be converted to the latter by the slow addition of dry alcohol to the mixture, or the mixture can be diluted with dioxan and treated with aqueous alcohol. When the mixture contains only alkoxy groups, any water miscible solvent may be used, preferably with a trace of acid such as HCl as catalyst. In this case, alcohol may be preferred on account of its relatively low cost. Mixtures of water miscible solvents may be used.

For a better understanding of my invention reference should be had to the following examples.

Example 1

To 400 grams (3.38 moles) of trimethylethoxysilane (B. P. 74°/740 mm.) was added 28 grams (0.1016 mole) of recrystallized triphenylsilanol, M. P. 150–151° C. Hydrochloric acid was added as a catalyst. The silanol crystals slowly dissolved with the evolution of heat, indicating a reaction:

$(CH_3)_3Si(OC_2H_5) + (C_6H_5)_3SiOH \rightarrow$
$(CH_3)_3Si\text{-}O\text{-}Si(C_6H_5)_3 + C_2H_5OH$ The molar ratio being 33/1 ensured a minimum formation of the symmetrical hexaphenyldisiloxane, M. P. 223.7–225° C. An excess of water was added to the reaction mixture and the upper organic layer was separated and washed with dilute potassium carbonate and then with water to remove acid and alcohol. The by-product hexamethyldisiloxane, B. P. 98–99° C., was removed by distillation at atmospheric pressure and the residue was then distilled at 230–235° C. and 26–27 mm. pressure. On cooling the distillate crystallized to a dry powder which was soluble in petroleum ether and had a melting point of 49.5–51.0° C. Analysis showed that this powder was 1,1,1-trimethyltriphenyldisiloxane, $(CH_3)_3Si\text{-}O\text{-}Si(C_6H_5)_3$. The yield was 96.5% based on the triphenylsilanol.

Example 2

A mixture of 62.35 grams of methyldiphenylethoxysilane, B. P. 92° C. at 0.5 mm., and 195 grams of dimethylphenylethoxysilane, B. P. 77° C. at 12 mm., in the molar ratio 1 to 4.2 respectively, was hydrolyzed by the slow addition of a solution of equal parts of 20% aqueous hydrochloric acid and 95% ethyl alcohol in small portions while the reaction mixture was cooled by a water bath and by shaking. The organic constituents were then dissolved in a mixture of ether and benzene and thoroughly washed with water to remove the alcohol and acid. The solvents were evaporated and the residue was distilled.

The fraction boiling at 130–140° C. and 3 to 5 mm. pressure was redistilled and the portion boiling at 292° C. under atmospheric pressure was identified by analysis as symmetrical tetramethyldiphenyldisiloxane.

The still residue, boiling above 205° C. at 3 to 5 mm. pressure, crystallized on cooling and was identified as symmetrical dimethyltetraphenyldisiloxane.

The fraction, boiling at 165–192° C. and 3 to 5 mm. pressure, was again redistilled and a product was obtained which boiled at 189° C. and 5 mm. or 364° C. and 745 mm. Analysis showed it was 1,1,2-trimethyltriphenyldisiloxane, $(CH_3)_2(C_6H_5)Si\text{-}O\text{-}Si(CH_3)(C_6H_5)_2$.

The yield was 67.3% based on the methyldiphenylethoxysilane; power factor at 1 megacycle was .005%.

Example 3

Pentamethylphenyldisiloxane was obtained from a mixture of dimethylphenylethoxysilane and trimethylethoxysilane in the manner set forth for Example 2 by hydrolyzing the mixture with water and hydrochloric acid and washing and distilling the reaction mixture. If desired, a mixture of the chlorosilanes could have been employed in lieu of the ethoxysilanes and similar results would have been obtained. The by-products were identified as hexamethyldisiloxane, boiling at 96.5° C. under atmospheric pressure and symmetrical tetramethyldiphenyldisiloxane boiling at 292° C. under atmospheric pressure. Another fraction which boiled at 206° C. under atmospheric pressure was shown by analysis to be pentamethylphenyldisiloxane, $C_6H_5(CH_3)_2Si\text{-}O\text{-}Si(CH_3)_3$. Its power factor measured at a frequency of 1 megacycle was .031%.

Example 4

Tribenzylchlorosilane and trimethylethoxysilane in the molar ratio 1 to 50 were mixed and hydrolyzed by the slow addition of aqueous hydrochloric acid. The product was washed with water to remove alcohol and acid and was distilled to yield a product boiling at 98° C., which was identified as hexamethyldisiloxane, a small crystalline residue, M. P. 198–199.5° C., which was identified as hexabenzyldisiloxane, and an intermediate product, B. P. 224°–225° C. at 6 mm. M. P. 36.8–37.2° C., which analysis showed to be 1,1,1-tribenzyltrimethyldisiloxane, $(C_6H_5CH_2)_3Si\text{-}O\text{-}Si(CH_3)_3$ Lubrication tests on a crude sample of the unsymmetrical disiloxane, before distillation and crystallization indicated good lubricity.

The unsymmetrical organo-disiloxanes which are prepared according to the new processes described above are in some instances liquids at normal temperatures and in other instances are solids. Both the liquid and the solid products have properties intermediate of those of the related symmetrical disiloxanes which render them useful for a variety of purposes. The liquid unsymmetrical organo-disiloxanes may be used as dielectric media or as damping or hydraulic media for the absorption and transmission of power or they may be used as heat transfer fluids. Likewise, the unsymmetrical disiloxanes which are solid may be used as dielectric media, heat transfer fluids and the like.

I claim:

1. In the process of preparing new synthetic compositions from mono-silanes having three mono-valent hydrocarbon radicals attached to each silicon atom through carbon-silicon linkages, the remaining valence of each silicon atom being satisfied by a hydrolyzable radical selected from the class consisting of halogen and alkoxy radicals, the steps comprising mixing two of said silanes, which differ from each other with respect to the chemical composition of that portion of their molecules exclusive of said hydrolyzable radicals, hydrolyzing the mixture, intercondensing the hydrolysis products and recovering therefrom the unsymmetrical organo-disiloxane.

2. Method according to claim 1 wherein the hydrocarbon radicals are the lower alkyl and phenyl radicals.

3. Method according to claim 1 wherein the hydrocarbon radicals are the lower alkyl and aralkyl radicals.

4. In the process of preparing new synthetic compositions from mono-silanes having three mono-valent hydrocarbon radicals and which consist of lower alkyl and phenyl radicals, attached to each silicon atom, the remaining valence of each silicon atom being satisfied by a hydrolyzable radical selected from the class consisting of halogen and alkoxy radicals, the steps comprising mixing two of said silanes, which differ from each other with respect to the chemical composition of that portion of their molecules exclusive of said hydrolyzable radical, treating the mixture with water in the presence of a hydrolysis catalyst to hydrolyze it, dehydrating the hydrolysis product to condense the product and form disiloxanes, and recovering the unsymmetrical disiloxane.

5. Method according to claim 4 in which the hydrolyzable radical is chlorine.

6. Method according to claim 4 in which the hydrolyzable radical is ethoxy.

7. Method according to claim 4 in which the hydrolyzable radical of one of the silanes is chlorine and the hydrolyzable radical of the other silane is ethoxy.

8. The method of preparing new synthetic compositions which comprises hydrolyzing a mixture of dimethylphenylethoxysilane and methyldiphenylethoxysilane condensing the hydrolysis products and recovering the dimethylphenyl-methyldiphenyldisiloxane.

9. The method of preparing new synthetic compositions which comprises hydrolyzing a mixture of tribenzylchlorsilane and trimethylethoxysilane, condensing the hydrolysis products and recovering the tribenzyltrimethyldisiloxane.

10. An unsymmetrical organo-di-siloxane having the formula

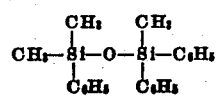

11. The method which comprises intercondensing two different triorgano silanols whose organic substituents consist of lower alkyl and phenyl radicals.

JAMES FRANKLIN HYDE.

REFERENCES CITED

The following references are of record in the file of this patent:

Beilstein, "Handbuch der Org. Chem.," 4th ed., vol. IV, pages 627–628.

Beilstein, "Handbuch der Org. Chem.," 4th ed., vol. XVI, pages 905–906.